US007647700B1

(12) United States Patent
Mracek

(10) Patent No.: US 7,647,700 B1
(45) Date of Patent: Jan. 19, 2010

(54) DEVICE FOR THE REMOVAL OF H-TAPS

(76) Inventor: Jeffrey J. Mracek, 1007 Hillsborough Chase, Kennesaw, GA (US) 30144

( * ) Notice: Subject to any disclaimer, the term of this patent is extended or adjusted under 35 U.S.C. 154(b) by 299 days.

(21) Appl. No.: 11/061,937

(22) Filed: Feb. 19, 2005

(51) Int. Cl.
*B21F 13/00* (2006.01)
(52) U.S. Cl. .......................................... 30/90.4; 30/90.8
(58) Field of Classification Search ............... 30/90.4, 30/90.8, 91.2, 90.9, 91.1, 90.1, 90.6, 90.7, 30/92
See application file for complete search history.

(56) References Cited

U.S. PATENT DOCUMENTS

| 2,165,209 | A | * | 7/1939 | Baldanza | 30/90.1 |
| 3,453,917 | A | * | 7/1969 | Perry | 30/90.8 |
| 4,447,991 | A | * | 5/1984 | Landgraf et al. | 451/41 |
| 6,119,972 | A | * | 9/2000 | Vogel et al. | 242/443 |
| 6,957,808 | B2 | * | 10/2005 | Varzino et al. | 269/95 |
| 2005/0121842 | A1 | * | 6/2005 | Lo | 269/6 |

FOREIGN PATENT DOCUMENTS

JP 01040212 * 2/1989

* cited by examiner

*Primary Examiner*—Stephen Choi
(74) *Attorney, Agent, or Firm*—Ariel S. Bentolila; Bay Area IP Group, LLC

(57) ABSTRACT

A device for the removal of a H-tap splice on an electrical wire is presented. The device includes a c-shaped frame and a blade suitable for cutting the H-tap. A drive bolt forces the H-tap into the H-tap cutting blade. The drive bolt has a tightening end and an H-tap engagement end having a flat surface for contacting the H-tap. The drive bolt is configured into one end of the frame. The blade is joined to the opposite end and positioned with a cutting edge substantially parallel to the wire. The combination is operable to force the H-tap engagement end towards the blade as the tightening end is tightened where the H-tap is cut without cutting the wire and the wire can be removed from the H-tap.

5 Claims, 3 Drawing Sheets

DEVICE FOR THE REMOVAL OF H-TAPS

FIELD OF THE INVENTION

The present invention relates generally to connector splicing devices. More particularly, the invention relates to splicing devices for the efficient removal of H-tap connectors.

BACKGROUND OF THE INVENTION

The removal of a type of connector referred to as "H-taps" from a utility lines is known to be a difficult problem with few, if any, practical solutions. Generally, H-taps are designed to tap into an electrical line for the addition of hardware or other reasons. Typically, "hot" electrical power lines cannot be cut without interrupting service to customers, which is where H-taps are often a useful alternative.

In many instances, a new pole must be placed in a very specific location, and the H-taps are in a position where the power wire cannot be tied to the replaced pole with the required preformed wire wraps, whereby it is then necessary to remove the H-tap. Current, the most often used approach to remove H-taps by linemen is a common hacksaw, which is very exhaustive and time consuming for the lineman.

In view of the foregoing, there is a need for improved techniques for the removal H-taps by linemen.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 b) illustrates an exemplary drive bolt in accordance with an embodiment of the present invention;

Unless otherwise indicated illustrations in the figures are not necessarily drawn to scale.

SUMMARY OF THE INVENTION

To achieve the forgoing and other objects and in accordance with the purpose of the invention, a variety of devices for the removal of H-taps are described.

A device for the removal of an H-tap splice is provided that includes means for restricting movement of the H-tap, means for cutting into the H-tap, and means for forcing the H-tap into the H-tap cutting means.

In some embodiments, the H-tap removal device is implemented as a c-shaped frame including a blade suitable for cutting the H-tap, means for forcing the H-tap into the H-tap cutting blade, the forcing means being configured into one end of the frame, and the blade being joined to the opposite end, such that the combination is operable to force the H-tap into the blade. In yet other embodiments the forcing means is a drive bolt for forcing the H-tap into the H-tap cutting blade such that the combination is operable to force the H-tap engagement end towards the blade as the tightening end is tightened.

Alternative bolt driven embodiments of the present invention may further include a pivoting member rotatably joined (e.g., by a screw and bearings) to an H-tap engagement end of the drive bolt so that the drive bolt can be turned without substantially turning the pivoting member when engaged onto the H-tap.

In some implementations, the surface of the pivoting member that makes contact with the H-tap is provided with a ridged surface texture for improved gripping onto the H-tap surface.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments.

Figure 1:
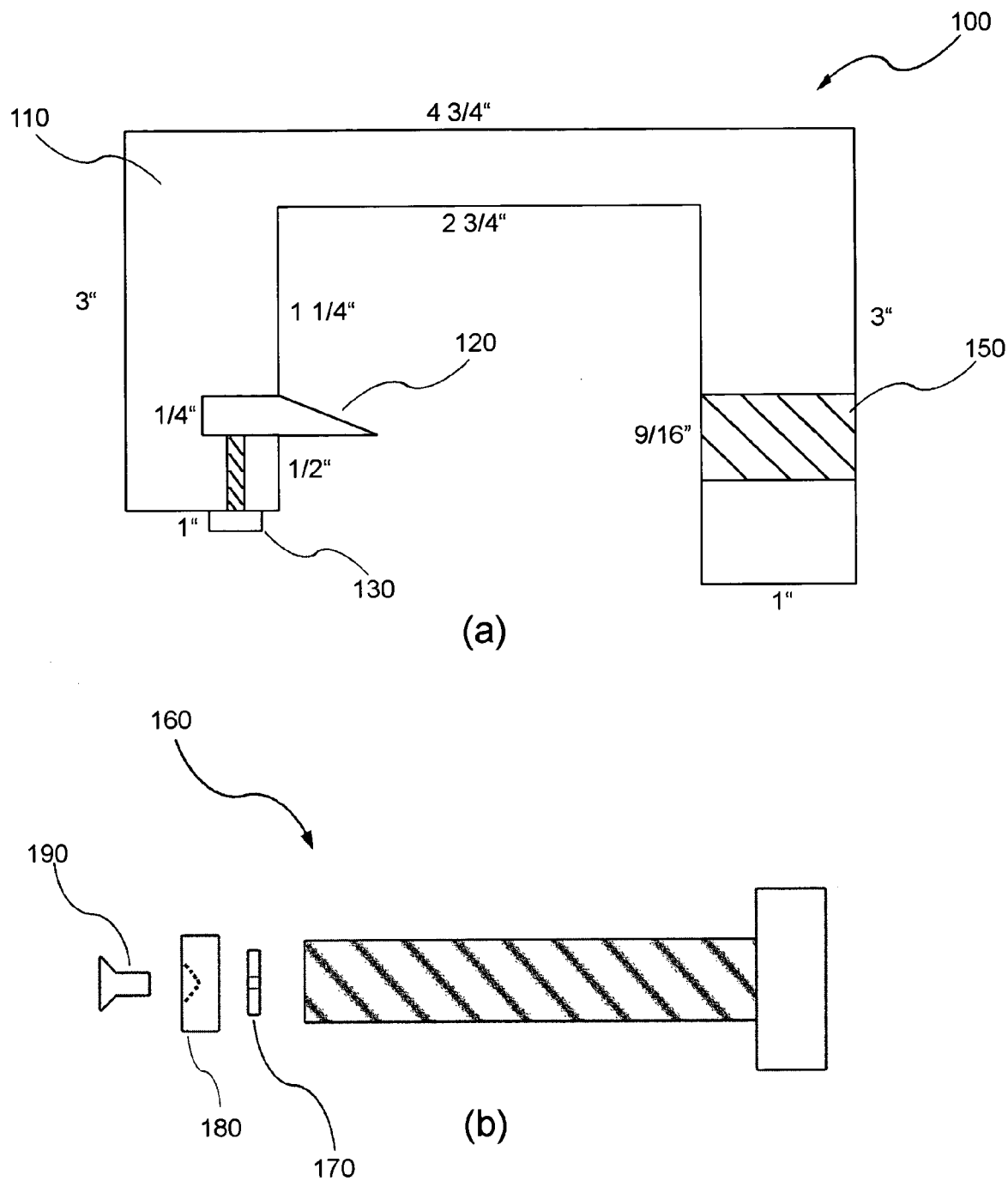
FIG. 1 a) illustrates a crossectional side view of an exemplary splicer removal assembly in accordance with an embodiment of the present invention.

FIG. 1 a) illustrates a crossectional side view of an exemplary splicer removal assembly 100 in accordance with an embodiment of the present invention. In the Figures, a c-shaped frame 110 is shown having a slicing blade 120, which is rigidly held in place by one or more retainer screw(s) 130, and a threaded drive bolt channel 150. In the example shown, frame 110 is one and half inches thick (not shown). It should be appreciated that all dimensions shown are presented completely by way of example only for illustrative purposes of one particular application, and may be readily configured as needed by those skilled in the art to suit the particular application.

FIG. 1 b) illustrates an exemplary drive bolt 160 in accordance with an embodiment of the present invention. In the embodiment shown, drive bolt 160 comprises a pivot bearing 170 that supports a pivot 180, which is held to the end of drive bolt 160 by a pivot screw 190. Pivot screw 190 may be adequately tightened or loosened to provide pivot 180 the desired degree of pivoting movement.

Figure 2:
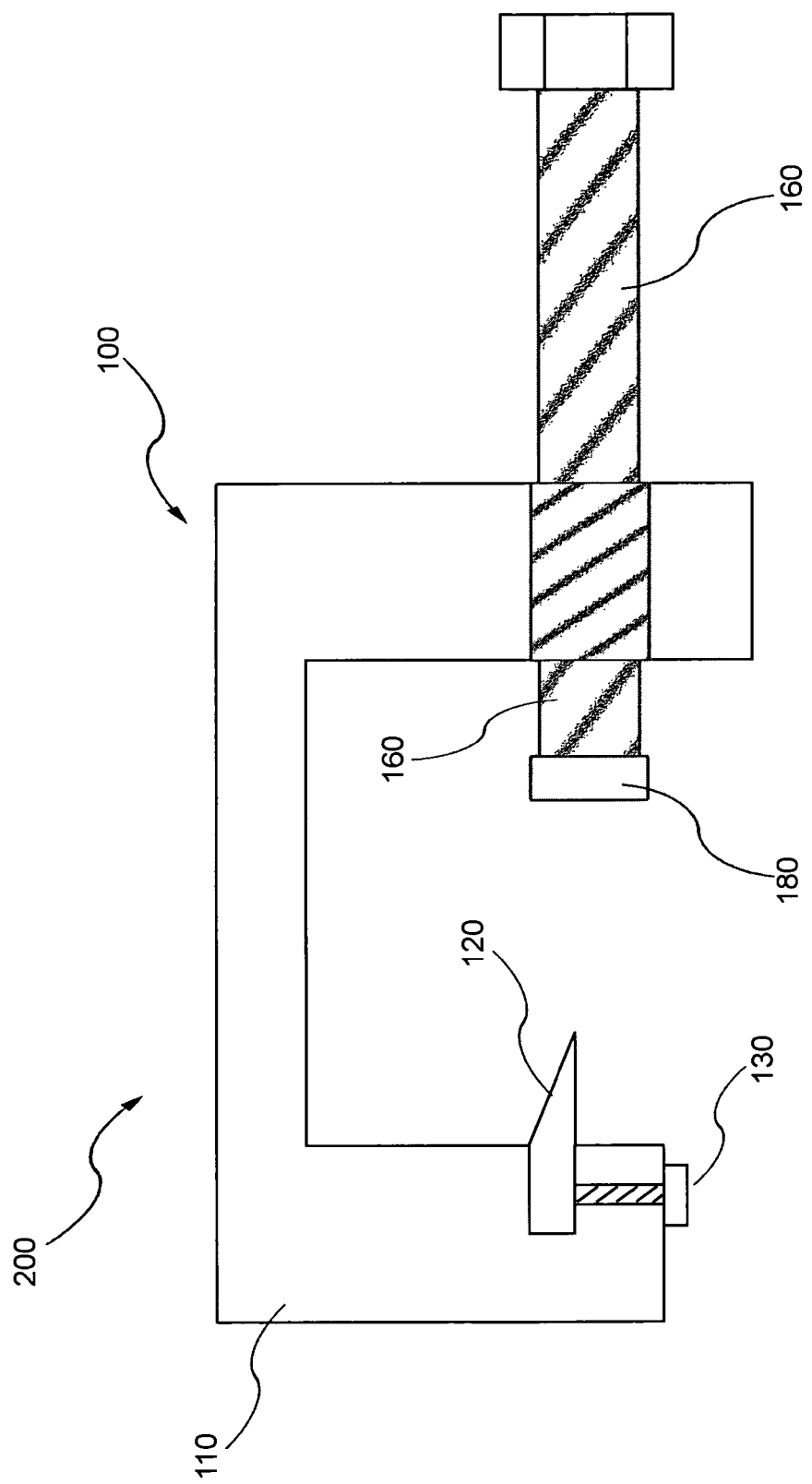
FIG. 2 illustrates by way of example a completed splicer removal assembly where the drive bolt is screwed into the drive bolt channel of the splicer removal assembly shown in FIG. 1.

FIG. 2 illustrates by way of example a completed splicer removal assembly 200 where the drive bolt is screwed into the drive bolt channel of the splicer removal assembly shown in FIG. 1.

Figure 3:
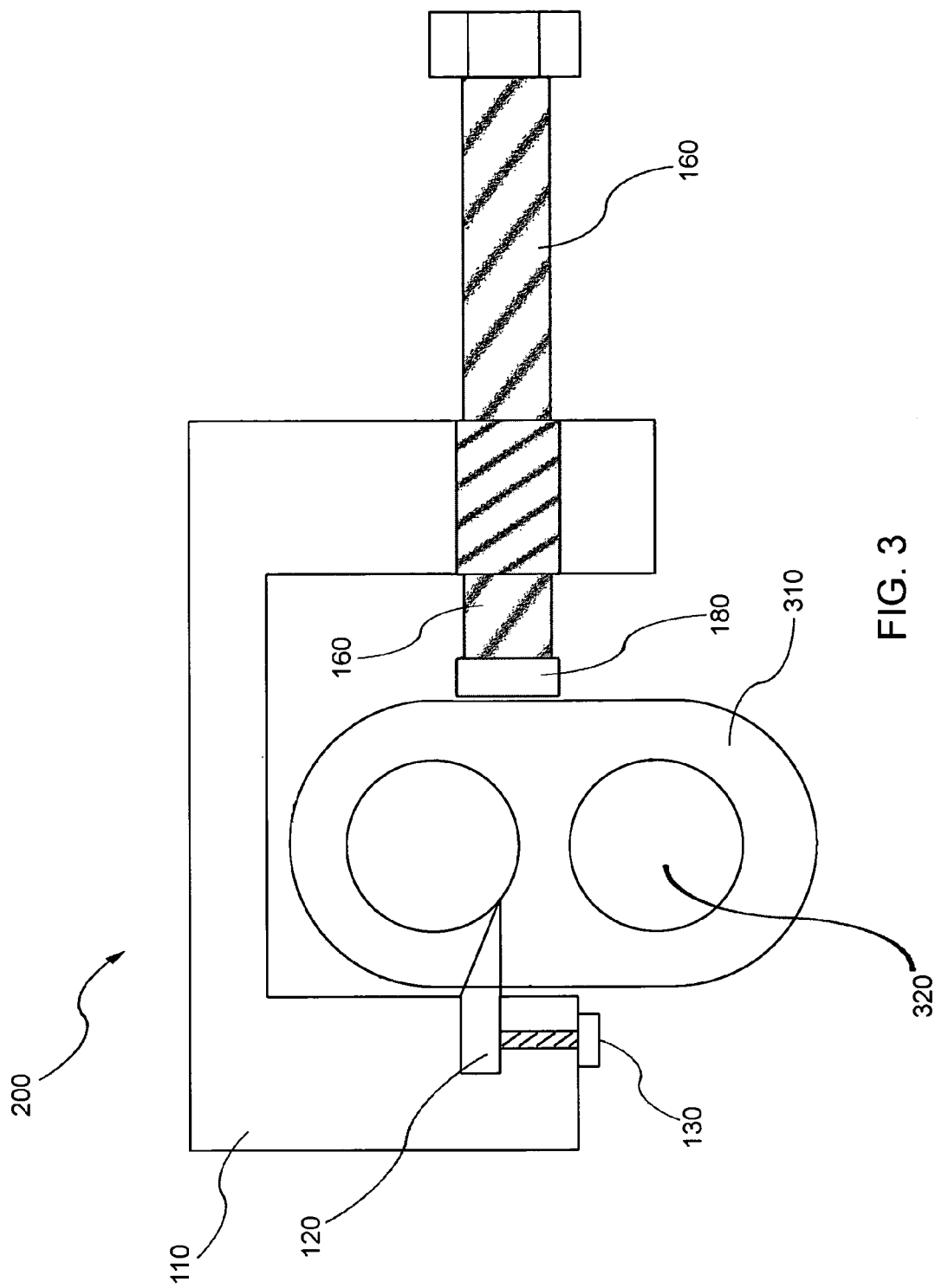
FIG. 3 illustrates by way of example the splicer removal assembly of FIG. 2 used in a typical application to splice an H-tap 310 containing wire(s).

FIG. 3 illustrates by way of example the splicer removal assembly of FIG. 2 used in a typical application to splice an H-tap 310 containing wire(s) 320 (typically 2 as shown, but at least one). As shown, splicer removal assembly 200 is put around H-tap 310, which is typically made of aluminum and mounted on an electrical line, and hand tightens the drive bolt 160, and thereby pivot 180, onto H-tap 310, which forces slicing blade 120 into H-tap 310 (as shown). Then an impact wrench, or the like, may be used to view the slicing action of slicing blade 120 into H-tap 310, and the drive bolt is further tightened until the blade has almost reached wire 320—cutting into the wire is typically to be avoided. At this point, H-tap 310 is cut clean through and a channel lock, for example, may be used to peel the H-tap connector off of the wire. Any excess aluminum from the wire may also be peel off as necessary.

In the application shown, pivot bearing 170, among other functions, enables pivot 180 to automatically make the angular adjustments necessary to maintain a proper retaining force against the curved H-tap, which keeps the H-tap from rotating while being cut by slicing blade 120.

It should be appreciated that some alternative embodiments of the drive bolt assembly 160 may not include the pivoting aspect shown, and instead simply use the bolt end itself to force the connector onto the blade. However, for embodiments of the present invention that omit the pivot assembly and only use the drive bolt to hold the H-tap in place, the result in some applications is that the drive bolt may not make adequate contact with the curved surface of the H-tap or the rotation of drive bolt twists away the H-tap, whereby the turning action of the drive bolt when tightening makes the H-tap roll in the present splicing tool at least because of the surface friction on the H-tap's curvature. In this way, pivot bearing 170 allows the drive bolt to be rotated without correspondingly rotating pivot 180 off of the H-tap. Pivot 180 is further provided with a knurling on its contact surface to further reduce any rotational friction. In some applications, the knurling aspect of the pivot may not be required to properly hold the H-tap in place while tightening the drive bolt.

In typical applications, splicer removal assembly 200 will be required to safely handle a large amount of force, and could be made of a suitably strong material such as high-grade steel. Similarly, slicing blade 120 will be made of a suitably strong material including, but not limited to, hardened, high-grade steel, which helps to prevent the connector from rolling away when the blade cuts into it. To support the relatively large forces involved, the C-frame of splicer removal assembly 200 may be constructed as a single piece.

The threads of drive bolt 160 and drive bolt channel 140 should be selected such that an adequate amount of force may be applied onto the connector of the particular application. For example, to increase the drive force achievable when tightening drive bolt 160, the threads may be of relatively fine coarseness. Those skilled in the art will readily recognize how to configure each aspect of splicer removal assembly 200, and its alternative embodiments, to suite the needs of the particular application and in accordance with the teachings of the present invention. A By way of example, and not limitation, the dimensions and shape of the present splicer removal assembly may be adjusted to best fit the type of connector being spliced, such that the slicing blade cuts the connector in the right location, generally, without cutting into the wire. Moreover, a multiplicity of conventional modifications may be implemented to adapt splicer assemblies of the present invention. For example, if the tool will be exposed to weathering, then exposed metal parts may be coated with an antirust material; e.g., a Zinc coating.

It will be further readily recognized that the means for driving the connector to be spliced into the slicing blade may vary depending on the needs of the particular application. By way of example and not limitation, instead of using a manually forced drive bolt approach, alternative embodiments (not shown) may power the drive bolt using a hydraulic, electric, or pneumatic cylinder to press the connector (e.g., the H tap) onto the slicing blade. In yet other embodiments (not shown), such alternative forcing means may be applied to force the slicing blade into the connector, while the connector is being rigidly held into place, instead of automatically driving the drive bolt. In embodiments where the splicer blade is automatically driven, the drive bolt aspect of the present invention may be removed or used to simple hold the connector to be splice rigidly in place while the splicer blade is automatically forced into the connector.

Other suitable approaches to the splice blade shown in the Figures may be implemented, as will be readily apparent to those skilled in the art. By way of example, and not limitation, in some alternative embodiments (not shown) a reciprocating blade (such as a jig saw, etc.) or a rotational cutoff wheel could replace the splicer blade to cut into the connector.

Having fully described at least one embodiment of the present invention, other equivalent or alternative methods of removing of H-Taps according to the present invention will be apparent to those skilled in the art. For example, although the foregoing embodiments were directed towards H-tap removal applications, those skilled in the art will readily recognize how to properly configure alternative embodiments of the present invention to at least partially cut other equivalent objects. The invention has been described above by way of illustration, and the specific embodiments disclosed are not intended to limit the invention to the particular forms disclosed. The invention is thus to cover all modifications, equivalents, and alternatives falling within the spirit and scope of the following claims.

What is claimed is:

1. A device for the removal of a H-tap connector, the device comprising:
    a frame comprising a first rectangular section, a second rectangular section extending from a first end of said first rectangular section along a plane in a direction perpendicular to said first rectangular section and a third rectangular section extending from a second end of said first rectangular section along said plane in said direction to form a rectangular c-shape comprising a generally uniform thickness along lines perpendicular to said plane, said second rectangular section comprising a slot with a length extending along a perpendicular line to said plane and having a side opening to an interior of said c-shape where said slot is symmetrical about a slot axis parallel to said plane and perpendicular to said direction, said second rectangular section further comprising a hole extending from said slot to a distal end of said second rectangular section in said direction, said third rectangular section comprising a threaded drive bolt channel comprising a thread having a determined thread pitch extending from an exterior of said c-shape to said interior symmetrically along a bolt axis parallel to said plane and perpendicular to said direction where said bolt axis is offset from said slot axis by an offset distance in said direction, said frame further comprising dimensions suitable for accepting the connector in said interior;
    a slicing blade comprising a rectangular portion fitting within said slot and a right triangular portion projecting into said interior with a hypotenuse of said right triangular portion facing said first rectangular portion;
    a retainer screw inserted in said hole and contacting said slicing blade to rigidly hold said slicing blade in said frame; and
    a drive bolt comprising a thread having said determined thread pitch and dimensions for engaging said threaded bolt channel, said determined thread pitch selected such that an adequate amount of force is applied onto the connector, said drive bolt further comprising a pivot bearing supporting a pivot attached to an end of said drive bolt in said interior by a pivot screw where said pivot screw is tightened or loosened to provide said pivot a desired degree of pivoting movement for contacting an uneven surface and said pivot bearing allows a rotation between said pivot and said drive bolt, said pivot comprising a generally circular flat surface facing said interior for contacting the connector, said drive bolt further comprising a bolt head on an end of said drive bolt in said exterior to which a rotational force is applied to advance said drive bolt into said interior and move the connector to contact the slicing blade where it is cut by applying an additional rotational force to said bolt head.

2. The device as recited in claim 1, wherein said flat surface further comprises a knurling reduces any rotational friction between said pivot and the connector.

3. The device as recited in claim 1, wherein said frame is constructed as from a single piece to support large forces during operation.

4. A device for the removal of a H-tap connector, the device comprising:

a frame comprising a first rectangular section a second rectangular section extending from a first end of said first rectangular section along a plane in a direction perpendicular to said first rectangular section and a third rectangular section extending from a second end of said first rectangular section along said plane in said direction to form a rectangular c-shape comprising a generally uniform thickness along lines perpendicular to said plane, said second rectangular section comprising a slot with a length extending along a perpendicular line to said plane and having a side opening to an interior of said c-shape where said slot is symmetrical about a slot axis parallel to said plane and perpendicular to said direction, said second rectangular section further comprising a hole extending from said slot to a distal end of said second rectangular section in said direction, said third rectangular section comprising a threaded drive bolt channel comprising a thread having a determined thread pitch extending from an exterior of said c-shape to said interior symmetrically along a bolt axis parallel to said plane and perpendicular to said direction where said bolt axis is offset from said slot axis by an offset distance in said direction, said frame further comprising dimensions suitable for accepting the connector in said interior;

means for slicing the connector, said slicing means fitting within said slot;

means for rigidly retaining said slicing means in a fixed position, using said hole;

means for moving the connector to contact said slicing means using said bolt channel and for further applying a force to the connector to slice the connector with said slicing means; and means for pivoting a distal end of said moving means contacting the connector.

5. The device as recited in claim 4, further comprising means for reducing rotational friction between said distal end and the connector.

* * * * *